(12) United States Patent
Murthy et al.

(10) Patent No.: US 8,001,272 B2
(45) Date of Patent: *Aug. 16, 2011

(54) OBTAINING A VALID INTERNATIONAL DESTINATION ADDRESS

(75) Inventors: Vikas Sanathana Murthy, Fremont, CA (US); Rajesh Tanamala Srivivas Reddy, Sunnyvale, CA (US); Mony Shetty, Bangalore (IN)

(73) Assignee: Syniverse ICX Corporation, Tampa, FL (US)

( * ) Notice: Subject to any disclaimer, the term of this patent is extended or adjusted under 35 U.S.C. 154(b) by 916 days.

This patent is subject to a terminal disclaimer.

(21) Appl. No.: 10/972,650

(22) Filed: Oct. 26, 2004

(65) Prior Publication Data

US 2005/0068947 A1    Mar. 31, 2005

Related U.S. Application Data

(62) Division of application No. 09/695,233, filed on Oct. 25, 2000, now abandoned.

(51) Int. Cl.
*G06F 15/16* (2006.01)

(52) U.S. Cl. ........ 709/245; 370/389; 709/201; 709/202; 709/206; 709/204; 709/238; 709/244

(58) Field of Classification Search ............ 709/245
See application file for complete search history.

(56) References Cited

U.S. PATENT DOCUMENTS

| | | | |
|---|---|---|---|
| 4,313,035 A | 1/1982 | Jordan et al. | 179/18 |
| 4,745,632 A | 5/1988 | Duffy | 379/58 |
| 5,161,184 A | 11/1992 | Smith et al. | |
| 5,197,092 A | 3/1993 | Bamburak | 379/59 |
| 5,243,645 A | 9/1993 | Bissell et al. | 379/211 |
| 5,315,636 A | 5/1994 | Patel | 379/58 |
| 5,347,633 A * | 9/1994 | Ashfield et al. | 709/238 |
| 5,414,752 A | 5/1995 | Jonsson | |
| 5,493,564 A | 2/1996 | Mullan | |
| 5,504,804 A | 4/1996 | Widmark et al. | |
| 5,506,894 A | 4/1996 | Billings et al. | 379/127 |
| 5,706,339 A | 1/1998 | Eisdorfer et al. | 379/211 |
| 5,742,668 A | 4/1998 | Pepe et al. | |

(Continued)

FOREIGN PATENT DOCUMENTS

WO      WO 97/26764      7/1997

(Continued)

OTHER PUBLICATIONS

Notice of Allowance from U.S. Appl. No. 11/371,029 mailed Jan. 21, 2010.

(Continued)

*Primary Examiner* — Alina N Boutah
*Assistant Examiner* — Adam Cooney
(74) *Attorney, Agent, or Firm* — Alston & Bird LLP

(57) ABSTRACT

A valid destination address is determined. An availability request is sent to each destination address from a set of destination addresses. The destination addresses are correlated with a destination party. At least one response to the sent availability requests is received. Each received response is uniquely associated with its own destination address from the destination addresses. Each received response indicates either a valid destination address or an invalid destination address. For each received response, a value associated with the destination address that is associated with that received response is recorded. The value indicates either a valid destination address or an invalid destination address based on the received response associated with that destination address.

10 Claims, 10 Drawing Sheets

U.S. PATENT DOCUMENTS

| | | |
|---|---|---|
| 5,742,905 A | 4/1998 | Pepe et al. |
| 5,754,640 A | 5/1998 | Sosnowski ............... 379/221 |
| 5,758,286 A | 5/1998 | Leppanen |
| 5,758,293 A | 5/1998 | Frasier |
| 5,781,614 A | 7/1998 | Brunson |
| 5,805,804 A | 9/1998 | Laursen et al. |
| 5,892,822 A | 4/1999 | Gottlieb et al. ............ 379/220 |
| 5,893,099 A * | 4/1999 | Schreiber et al. .......... 709/201 |
| 5,903,638 A | 5/1999 | Welter, Jr. et al. ......... 379/220 |
| 5,920,815 A | 7/1999 | Akhavan ................. 455/426 |
| 5,933,483 A | 8/1999 | Pellegrino et al. ......... 379/201 |
| 5,937,053 A | 8/1999 | Lee et al. ................. 379/220 |
| 5,946,629 A | 8/1999 | Sawyer et al. |
| 5,978,672 A | 11/1999 | Hartmaier et al. ......... 455/413 |
| 6,011,843 A | 1/2000 | Hochman et al. .......... 379/211 |
| 6,018,524 A | 1/2000 | Turner et al. |
| 6,018,737 A | 1/2000 | Shah et al. ................. 707/10 |
| 6,028,917 A | 2/2000 | Creamer et al. ........ 379/100.01 |
| 6,038,644 A | 3/2000 | Irie et al. |
| 6,052,457 A | 4/2000 | Abdelaal et al. ........... 379/220 |
| 6,069,945 A | 5/2000 | Brown et al. .............. 379/220 |
| 6,084,969 A | 7/2000 | Wright et al. |
| 6,092,114 A | 7/2000 | Shaffer et al. |
| 6,104,789 A | 8/2000 | Lund |
| 6,108,709 A | 8/2000 | Shinomura et al. ......... 709/239 |
| 6,125,176 A | 9/2000 | Foladare et al. ........... 379/211 |
| 6,157,945 A | 12/2000 | Balma et al. |
| 6,307,931 B1 | 10/2001 | Vaudreuil |
| 6,311,057 B1 | 10/2001 | Barvesten |
| 6,356,935 B1 * | 3/2002 | Gibbs ....................... 709/206 |
| 6,381,650 B1 | 4/2002 | Peacock |
| 6,389,276 B1 | 5/2002 | Brilla et al. |
| 6,427,164 B1 * | 7/2002 | Reilly ...................... 709/206 |
| 6,438,583 B1 * | 8/2002 | McDowell et al. .......... 709/206 |
| 6,493,558 B1 | 12/2002 | Bernhart et al. |
| 6,546,425 B1 | 4/2003 | Hanson et al. |
| 6,549,937 B1 * | 4/2003 | Auerbach et al. ........... 709/206 |
| 6,584,095 B1 | 6/2003 | Jacobi et al. |
| 6,615,231 B1 | 9/2003 | Deen et al. |
| 6,628,965 B1 | 9/2003 | LaRosa et al. |
| 6,643,685 B1 | 11/2003 | Millard |
| 6,643,686 B1 | 11/2003 | Hall |
| 6,654,779 B1 * | 11/2003 | Tsuei ........................ 709/206 |
| 6,690,394 B1 | 2/2004 | Harui |
| 6,731,630 B1 | 5/2004 | Schuster et al. |
| 6,754,622 B1 * | 6/2004 | Beser et al. ................ 709/245 |
| 6,792,474 B1 | 9/2004 | Hopprich et al. |
| 6,832,246 B1 * | 12/2004 | Quine ...................... 709/207 |
| 6,834,324 B1 | 12/2004 | Wood |
| 6,854,007 B1 | 2/2005 | Hammond |
| 6,901,436 B1 * | 5/2005 | Schneider ................. 709/219 |
| 7,003,555 B1 | 2/2006 | Jungck |
| 7,403,970 B1 | 7/2008 | Kamble et al. |
| 2003/0120811 A1 | 6/2003 | Hanson et al. |
| 2004/0243719 A1 | 12/2004 | Roselinsky |
| 2008/0256201 A1 * | 10/2008 | Flowers et al. ............. 709/206 |

FOREIGN PATENT DOCUMENTS

| | | |
|---|---|---|
| WO | WO 97/50230 | 12/1997 |
| WO | WO 98/00987 | 1/1998 |
| WO | WO 98/26621 | 6/1998 |
| WO | WO 00/04679 | 1/2000 |
| WO | WO 00/04689 | 1/2000 |
| WO | WO 00/16571 | 3/2000 |
| WO | WO 00/22800 | 4/2000 |
| WO | WO 00/42809 | 7/2000 |
| WO | WO 00/07612 | 11/2000 |

OTHER PUBLICATIONS

Notice of Allowance from U.S. Appl. No. 10/972,712 mailed May 14, 2010.
Final Office Action U.S. Appl. No. 10/972,388 mailed Jun. 9, 2010.
Office Action from U.S. Appl. No. 10/972,388 mailed Dec. 28, 2010.
Office Action U.S. Appl. No. 10/972,388 mailed Dec. 17, 2008.
Office Action U.S. Appl. No. 10/972,388 mailed Oct. 14, 2009.

* cited by examiner

| Destination Address ~300 | | | | | | | |
|---|---|---|---|---|---|---|---|
| Formatted Requested Address 300 | Carrier Identifier 320 | Network Identifier 330 | Gateway Identifier 340 | Device Identifier 350 | Destination Country 360 | Validity Indicator | Device Capabilities 380 |
| 408-555-1212 | Sprint | PCS Wireless | ABC 123 | | USA | Unknown | 120-character GUI |
| | Sprint | Sprint | XYZ 123 | XXX-111 | | Unknown | |
| | Sprint | MCI | MNO 111 | | | Invalid | |
| 919-844-1212 | India Telco | cellular GSM | IND 123 | ZZZ-222 | India | Valid | 120-character GUI |
| 301-555-1111 | Bell Atlantic | wireless-BA | BEL 111 | XYZ-1234 | USA | Valid | 100-character GUI |
| | MCI | pager | MCI 112 | | | Unknown | 30-character GUI |
| jsmith@xyz.com | Internet | e-mail | XYZ 555 | | USA | Valid | Personal Computer GUI |
| jsmith | AOL | Instant Messaging ID | AOL 111 | | USA | Valid | Personal Computer GUI |
| number@pager.mirabis.com | | Instant Messaging ICQ | ICQ 222 | | USA | Valid | |
| number@mobile.att.com | ICQ Network | wireless e-mail | | | USA | Valid | 130-character GUI |

FIG. 3

OBTAINING A VALID INTERNATIONAL DESTINATION ADDRESS

CROSS-REFERENCES

This application is a divisional of application Ser. No. 09/695,233, filed Oct. 25, 2000 now abandoned, which is incorporated herein by reference in its entirety.

The present invention is related to patent applications "Method and Apparatus for Assigning and Text-messaging to Multiple Text-Capable Destination Entities with a Virtual Address" Ser. No. 09/695,235 and "Seamless Selection from at Least Two Destination Entities for Text Messaging"application Ser. No. 09/695,234, both of which are incorporated herein by reference.

BACKGROUND OF THE INVENTION

The present invention relates generally to electronic text messaging. More specifically, the present invention relates to universal address recognition for text-capable communication devices.

With the increasing globalization and convergence of telecommunications, communicating across different communication networks having different carriers to different types of communication devices is becoming increasingly more desirable. For example, several different types of communication devices exist that can receive text messages, such as text-capable wireless phones, personal computers operating various types of desktop applications and text-capable pagers. Typically, these different types of text-capable communication devices operate on some of the different networks having different carriers (i.e., different business entities that operate the different physical networks).

Several difficulties exist, however, in conveniently communicating with varied devices across such varied networks operated by varied carriers. For example, addressing standards do not exist for these different networks with their various carriers. In addition, different types of networks cannot be interconnected without using network gateways. For example, a Global System for Mobile Communication (GSM) network cannot be connected to a time-division multiple access (TDMA) network without a network gateway. The presence of such a network gateway, however, typically requires routing information that cannot be easily obtained from, for example, a telephone number alone.

Moreover, a source party typically does not know much routing information beyond the telephone number. For example, to send a text-message to a text-capable mobile phone, many carrier operators require not only the telephone number for a given destination mobile phone, but also require a carrier identifier and/or network identifier for that mobile phone. Thus, a source party of a text message typically needs to know the telephone number of the mobile phone, the carrier identifier and/or network identifier for that phone, and possibly other types of information. Such information may not be readily available or even easily obtainable for a source party.

Thus, a need exists for providing universal recognition of destination addresses for a wide variety of text-capable communication devices.

SUMMARY OF THE INVENTION

A valid destination address is determined. An availability request is sent to each destination address from a set of destination addresses. The destination addresses are correlated with a destination party. At least one response to the sent availability requests is received. Each received response is uniquely associated with its own destination address from the destination addresses. Each received response indicates either a valid destination address or an invalid destination address. For each received response, a value associated with the destination address that is associated with that received response is recorded. The value indicates either a valid destination address or an invalid destination address based on the received response associated with that destination address.

BRIEF DESCRIPTION OF THE DRAWINGS

FIG. 3 illustrates an example of a database record associating a formatted requested address with potential carriers according to an embodiment of the present invention.

DETAILED DESCRIPTION

Figure 1:
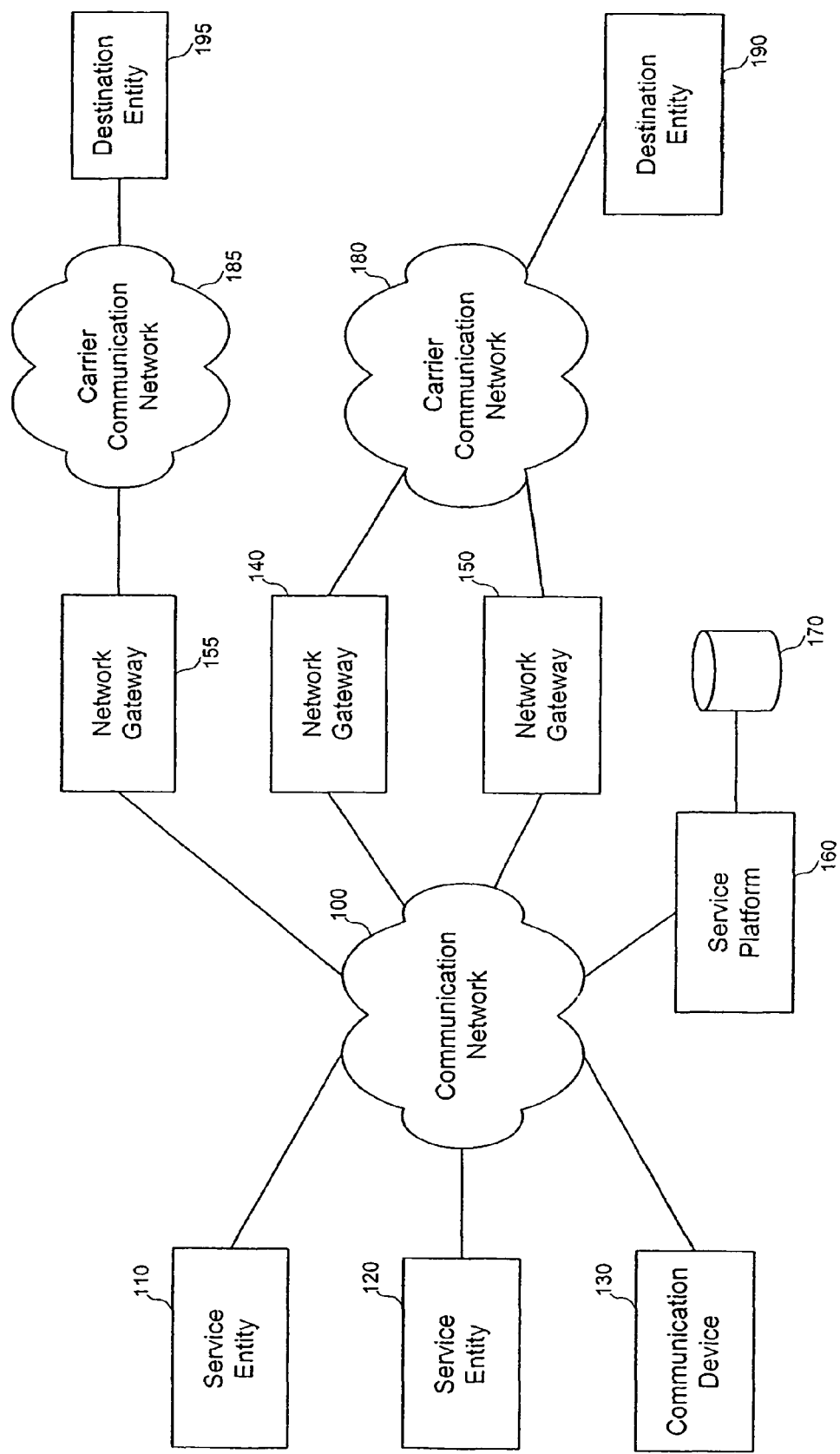
FIG. 1 illustrates a system block diagram of a communication system, according to an embodiment of the present invention.

As discussed above in the background section, different types of networks and different types of devices cannot be interconnected without routing information (e.g., the carrier identifier and/or network identifier) in addition to a telephone number. Typically, a source party typically does not know or cannot easily obtain such routing information. Consequently, at best, multiple carriers potentially associated with, for example, a telephone number can be identified. Without further eliminating at least some of these potentially associated carriers, a message cannot be efficiently and/or effectively delivered to a desired destination party.

In certain embodiments of the present invention, an availability request is sent to each destination address from a set of destination addresses. The destination addresses are correlated with a destination party. At least one response to the sent availability requests is received. Each received response is uniquely associated with its own destination address from the destination addresses. Each received response indicates either a valid destination address or an invalid destination address. For each received response, a value associated with the destination address that is associated with that received response is recorded. The value indicates either a valid destination address or an invalid destination address based on the received response associated with that destination address.

The term "availability request" used herein to mean any type of message or query that seeks to determine the availability of a particular destination address. The "destination address" as used herein means the minimum information related to routing a text message to a text-capable destination entity and includes at least the requested address (e.g., a numeric-based address such a telephone number or alphanumeric address such as an e-mail address) and a carrier identifier. Destination addresses are correlated with a destination party in the sense that they are potentially associated with a destination party; upon further analysis, one or more of these destination addresses may not be correctly related to the destination party.

In the cases where portion(s) of the destination address provided by a source party is insufficient to determine a specific destination entity, the availability request can be sent to the correlated destination addresses (defined, in part, by the various possible carriers). The responses received to the availability requests can indicate whether that destination address is the address of the intended destination entity. In other words, the received response(s) indicates whether that respective destination address is valid or invalid. The destination addresses for which no response is received can be considered as possibly correct destination addresses.

In one embodiment, once an attempt has been made to eliminate as many invalid destination addresses as practical, the received message can be multicasted to the remaining possible destination addresses. This minimizes the unnecessary waste of network resources by attempting to connect to and/or sending the message to invalid destination addresses that can be eliminated beforehand.

FIG. 1 illustrates a system block diagram of a communication system, according to an embodiment of the present invention. Communication network 100 is coupled to service entities 110 and 120, communication device 130, service platform 160 and network gateways 140, 150 and 155. Service platform 160 is also coupled to storage device 170. Network gateways 140 and 150 are also coupled to carrier communication network 180, which is also coupled to destination entity 190. Network gateway 155 is also coupled to carrier communication network 185, which is also coupled to destination entity 195.

Service entities 110 and 120 can be any type of service provider or content provider that provides electronic content over communications network 100. For example, the service entity 110 can be a web-based service that provides push-based content, such as a newspaper, on a periodic and automatic basis an electronic text-based version of the newspaper from the service entity 110 to a previously designated destination party. In this example, the content from service entity 110 is pushed to the destination entity rather than being fetched (or pulled) from the service entity by the destination entity. Said another way, the content from service entity is "pushed" to the destination entity because the service entity provides specific content based on a previous general request.

Communication network 100 and carrier communication networks 180 and 185 can be any type of appropriate networks capable of transmitting voice and/or data. Communication network 100 and/or carrier communication networks 180 and/or 185 can be, for example, any interconnecting network such as an intranet (e.g., a local or wide area network), or an extranet (e.g., the World Wide Web or the Internet). Similarly, communication network 100 and/or carrier communication networks 180 and/or 185 can include various wireless connections as well. For purposes of clarity of discussion, the communication network 100 can be considered in reference to a source, such as, for example, service entities 110 and 120 and/or communication device 130; carrier communication networks 180 and 185 can be considered in reference to a destination (e.g., destination entities 190 or 195) and the carrier serving that destination.

Network gateways 140 and 150 are devices that allow interconnection between communication network 100 and carrier communication network 180. Similarly, network gateway 155 is a device that allows interconnection between communication network 100 and carrier communication network 185. For example, where communication network 100 and carrier communication network 185 are operated by different carriers, network gateway 155 can interconnect these networks. In cases where the source party and the destination party are located in different countries, their respective networks will be operated by different carriers. Consequently, in routing a session from the source party to the destination party, the session can be routed through the source network (e.g., communication network 100) through a network gateway (e.g., network gateway 155) to the destination network (e.g., carrier communication network 185).

In another example, network gateways 140 and 150 can be used to interface networks that cannot connect directly for technical incompatibility. For example, the same given carrier can operate different types of networks such as a time-division multiple access (TDMA) network and a code-division multiple access (CDMA) network. In such a case, to route a session from a portion of communication network 100 to a portion of the carrier communication network 180 (e.g., having a TDMA portion and a CDMA portion), the session can be routed through the network gateway associated with that type of network interconnection. In other words, in such a case, network device 140 can be, for example, associated with a TDMA portion of carrier communication network 180 and network device 150 can be, for example, associated with a CDMA portion of carrier communication network 180.

Service platform 160 is a computer hardware and/or software system capable of interacting with communication network 100 and capable of performing universal address recognition. Messaging service platform 160 has the appropriate hardware and/or software to receive the appropriate information for a session and to determine the appropriate routing information for that session, according to embodiments of the present invention. For example, messaging service platform 160 can have hardware and/or software that performs the method described below in conjunction with FIGS. 2 and 3. Storage device 170, which is coupled to service platform 160, can store various databases to be used in conjunction with the methods performed by service platform 160.

Destination entities 190 and 195 can be any appropriate type of communication devices and/or computer-based applications that are text-message-capable and push-capable. For example, destination entities 190 and 195 can be text-message-capable, push-capable pagers, wireless phones, hand-held wireless devices (e.g., a personal digital assistant (PDA) or handheld personal computer (HPC)) and/or desktop computer applications. The desktop computer applications can be, for example, a text-messaging application, an instant-messaging desktop application or any other type of text-message-capable, push-capable application that is connected to a communication network, such as the Internet via a computer.

FIGS. 2A through 2E illustrate a process for performing universal address recognition, according to an embodiment of the present invention. At step 200, an electronic text message having a requested address associated with a destination party is received. The received text message can be sent from a source party such as, for example, a source party associated with service entities 110 or 120 or communication device 130.

At step 210, the requested address of the received text message is formatted. If the requested address is an international telephone address, the requested address is formatted by translating the requested address into an international dialed number. For example, an international dialed number having a source party located in the U.S. will typically have an international prefix of "011" leading the remainder of the international dialed number. Thus, the requested address can be formatted by removing this international prefix.

At conditional step 220, a determination is made as to whether the formatted requested address is invalid. The formatted requested address can be determined as invalid, for example, where the address is numeric is has an insufficient number of digits. Alternatively, the formatted requested address can be determined as invalid, for example, where the address is alphanumeric having an improper e-mail format. If the formatted requested address is invalid then the process proceeds to step 230. At step 230, a message is sent to the source party indicating that the requested address is invalid. If, however, the formatted requested address is valid then the process proceeds to conditional step 235.

At conditional step 235, a determination is made as to whether the formatted requested address is a number-based address. For example, a number-based address can include seven or ten digit number associated with a telephone, a wireless phone or a wireless device (e.g., a PDA) that is addressable by a telephone number. Alternatively, a number-based address can includes for example, a thirteen digit international number again associated with a telephone, a wireless phone or any type of appropriate wireless device. If the formatted requested address is a number-based address, the process then proceeds to step 240. If the formatted requested address is not a number-based address, the process proceeds to conditional step 600 shown in FIG. 2E. At step 240, a destination country is determined based on the formatted requested address. For example, when the formatted requested address is an international number, the country code can be determined and compared to a list of valid country codes. At step 250, a carrier-prefix type is determined based on the destination country and the formatted requested address.

At conditional step 260, a determination is made as to whether the formatted requested address previously has been uniquely identified for the destination party. Based on a previous analysis (i.e., a previous performance of the method described in FIGS. 2A through 2E), the formatted requested address possibly may have been previously analyzed. In such a case, the correct destination address (including, for example, the correct carrier identifier 310) has been previously and uniquely identified for the destination party. If that is the case, then the process proceeds to step 270. If, however, the formatted requested address has not been previously and uniquely identified for the destination party, then the process proceeds to conditional step 300 shown in FIG. 2B.

At step 270, the destination address is determined based on the formatted requested address. The destination address can include, for example, the formatted requested address, the carrier identifier, the network identifier and the gateway identifier. The proper destination address allows the message to be effectively sent to a destination entity associated with the destination party. A look-up table can be used to obtain the appropriate routing information such as, for example, the carrier identifier, the network identifier and the gateway identifier, that are collectively referred to herein as part of a destination address. An example of a record from such a look-up table is illustrated in FIG. 3. At step 275, the received text message is sent to the destination address via the previously identified carrier.

FIG. 3 illustrates an example of a database record associating a formatted requested address with various routing information (e.g., carrier identifier, etc.). In this example of FIG. 3, database record 301 includes destination address 300. Destination address 300 includes formatted requested address 310, carrier identifier 320, network identifier 330, gateway identifier 340 and device identifier 350. Database record 301 can also contain destination country 360, validity identifier 370 and device capabilities 380. As the example in FIG. 3 illustrates, a particular formatted requested address (e.g., telephone number 408-555-1212) can be associated with multiple potential carriers (e.g., Sprint PCS Wireless Network, Sprint Network and MCI Network). Each of these multiple carriers that are correlated with a formatted requested address has several parameters that can be part of the routing information used to successfully route a message to the requested destination entity. For example, a given carrier can have a carrier identifier 320, network identifier 330 and gateway identifier 340. The particular destination entity can also have an identifier that is independent of the particular carrier identifier that correctly is associated with the destination party. Device identifier 350 can include, for example, a personal identification number (PIN) or password that may be required by a destination network. Database record 301 also includes an indication of destination country 360 for the associated carrier and a validity indicator 370 associated with the carrier. As a carrier is correlated with a destination address as identified as being appropriately associated with that destination address, the validity indicator 370 for that particular carrier can be indicated as being either invalid or valid. Finally, device capabilities 380 provide information relating to the user interface available for the particular device as identified by device identifier 350.

Figure 2A:
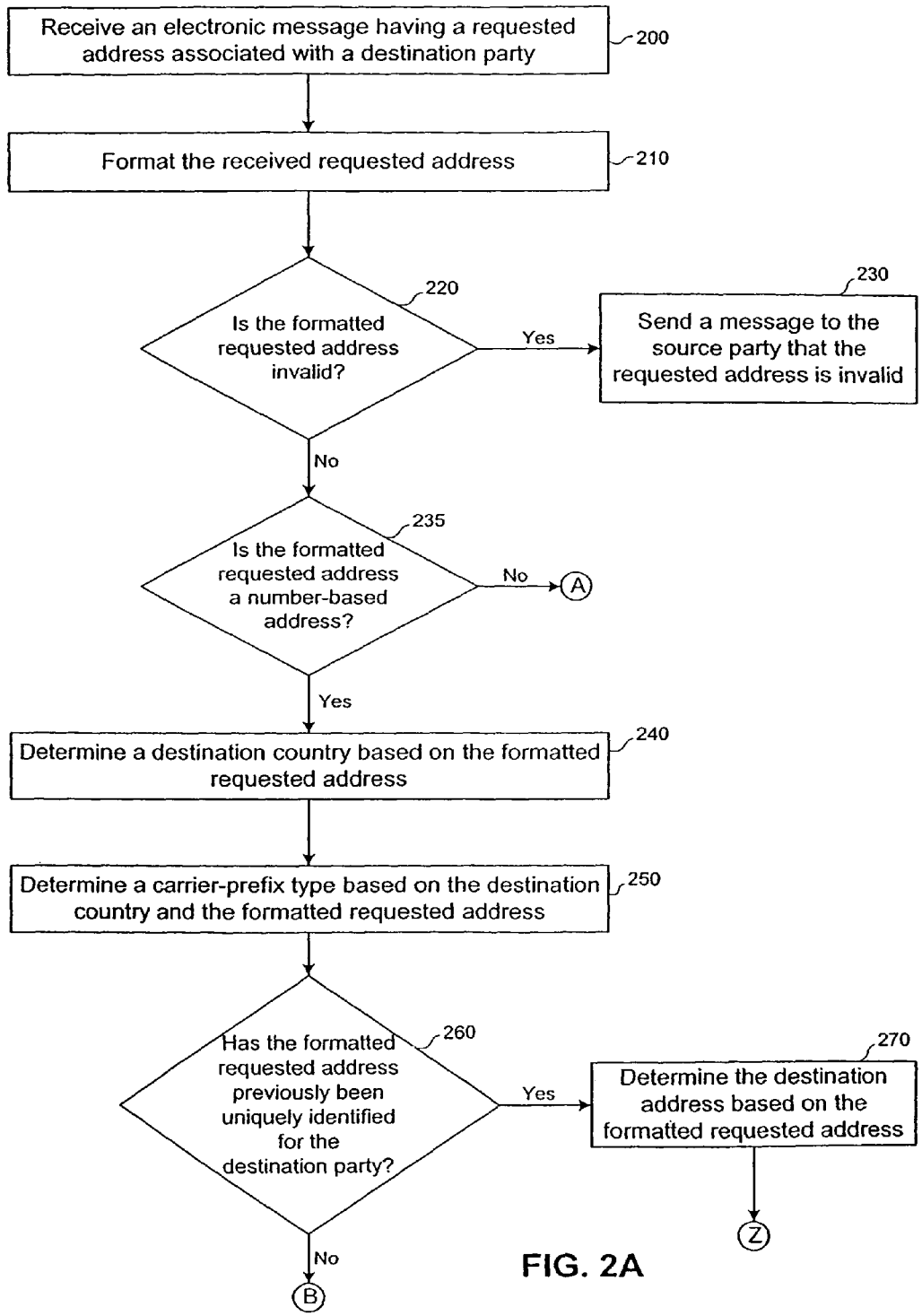
FIGS. 2A through 2E illustrate a process for performing universal address recognition, according to an embodiment of the present invention.
Figure 2B:
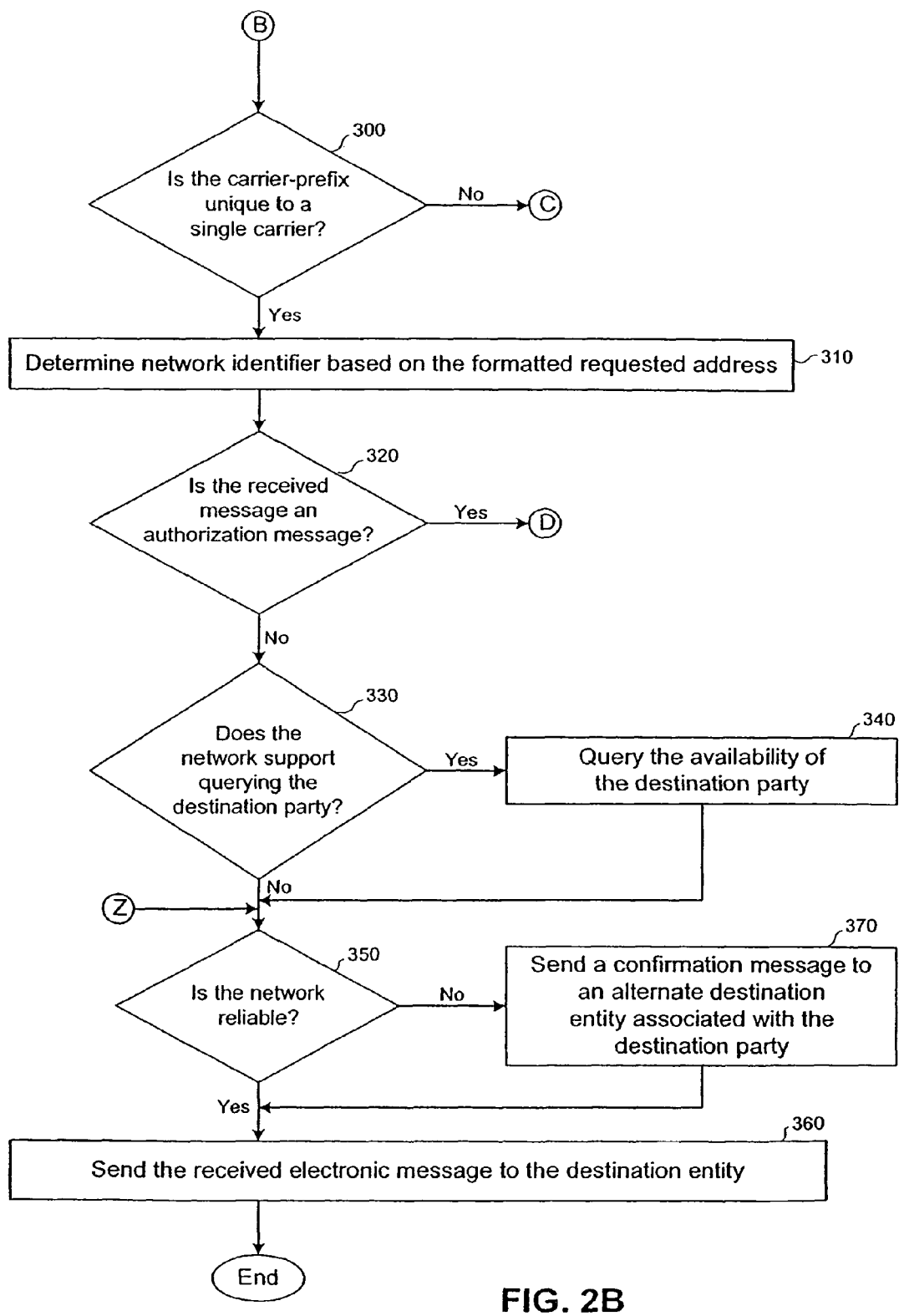

Returning to the process discussed in reference to FIG. 2, at conditional step 300 shown in FIG. 2B, a determination is made as to whether the carrier prefix associated with the formatted requested address is unique to a single carrier. Generally speaking, number-based addresses can be characterized in one of three ways: (1) a single carrier type; (2) an embedded carrier type; and (3) a number-portability type. In the case where the carrier prefix type is unique to a single carrier, the carrier associated with that carrier prefix type can be uniquely identified based on a predetermined correlation alone. Said another way, when the carrier prefix is unique to a single carrier, a repeated identification of the correct carrier from a multiplicity of carriers is unnecessary. Note that the term carrier prefix used more broadly than just the three-digit prefix; in certain cases, it may be necessary to consider more digits than just the traditional three digits of the carrier prefix to successfully characterized a number-based address. If the carrier type is unique to a single carrier then the process proceeds to step 310. If, however, the carrier-prefix type is not unique to a single carrier, the process then proceeds to step 400 shown in FIG. 2C.

At step 310, a network identifier is determined based on the formatted requested address. The network identifier (e.g., network identifier 340) is determined, for example, by the look-up table of FIG. 3 based on the formatted requested address.

At conditional step 320, a determination is made as to whether the received message is an authorization message. An authorization message is a message sent from a service platform (e.g., service platform 160) to a destination party inviting the destination part to reply to the message, thereby self authenticating the appropriate routing information needed for future routing to that particular destination party. If the received message is an authorization message then the process proceeds to step 500 shown in FIG. 2D. If the received message is not an authorization message then the process proceeds to conditional step 330.

At conditional step 330, a determination is made as to whether the destination network supports querying the destination party at the destination entity. If the destination network does support querying, then the process proceeds to step 340. At step 340, the availability of the destination party is queried and an availability status is determined based on the query response.

At conditional step 350, a determination is made as to whether the destination network is reliable. If the destination network is reliable then the process proceeds to step 360. At step 360, the received electronic message is sent to the destination entity. If, however, the destination network is not reliable then the process proceeds to step 370. At step 370, a confirmation message is sent to an alternative destination entity associated with the destination party. For example, the confirmation message may indicate that the message is to be sent to the originally requested destination entity and if it was not appropriately received at the originally requested destination entity, then the destination party can seek a retransmission. Alternatively, the confirmation message may be merely a duplicate of the message sent to the originally requested destination entity. Thus, if the destination party is unable to read the message at the originally requested destination entity, then the destination party can read the message at the alternate destination entity.

Figure 2C:
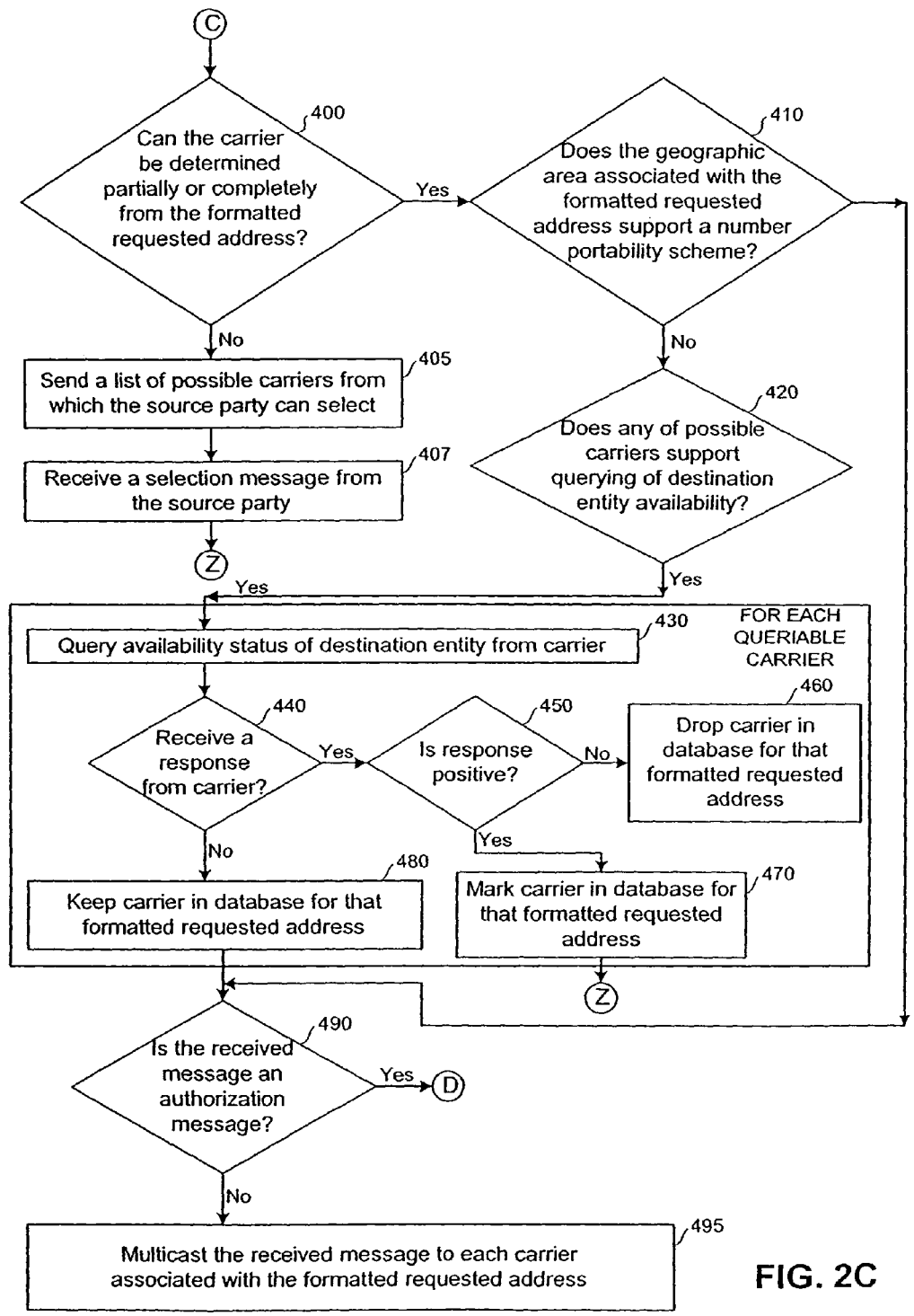

At conditional step 400 shown in FIG. 2C, a determination is made as to whether the carrier can be determined partially or completely based on the formatted requested address. If the carrier can be determined then the process proceeds to conditional step 410. If the carrier cannot be determined from the formatted requested address then the process proceeds to step 405.

At step 405, a message includes a list of possible carriers from which the source party can select the carrier that is associated with the destination party is sent to the source party. The list of possible carriers associated with the destination party can be obtained from the database record 301 based on the formatted requested address. At step 407, a selection message is received from the source party. The selection message indicates a carrier (from the list of possible carriers) that the source party indicated is associated with the destination party.

At conditional step 410, a determination is made as to whether the geographic area associated with the formatted request address supports a number-portability scheme. If the geographic area associated with the formatted requested address does support a number-portability scheme then the process proceeds to conditional step 490. If a number-portability scheme is supported in the geographic area, then a particular destination address that possibly was associated with a specific carrier in the past may no longer be associated with that same carrier. Rather, that particular destination address may be associated with a different carrier. Consequently, the actual present carrier can be determined by multicasting the message to each carrier operating in an geographic area associated with the formatted requested address (the multicasting step is described below). If the geographic area associated with the formatted requested address does not support a number-portability scheme then the process proceeds to conditional step 420 as shown in FIG. 2B.

At conditional step 420, a determination is made as to whether any of the possible carriers support querying of the destination entity availability. If none of the possible carriers support querying of the destination entity availability, the process proceeds to conditional step 490. If, however, at least one of the possible carriers associated with the destination address supports querying the availability of the destination entity, then the process proceeds to steps 430 through 480 for each carrier that supports querying.

At step 430, the availability status of a potential destination entity for a given carrier is queried. In other words, at this point, multiple carriers have been identified as being potentially associated with a particular destination address; of these multiple carriers, only one carrier is the actual carrier that will correctly deliver the received message to the destination party at the associated destination entity. Consequently, by querying each of these potential carriers, the carrier that is correctly associated with the destination party may be identified, or at least one or more carriers that are not associated with the correct destination entity can be determined.

At conditional step 440, a determination is made as to whether a response to the query is received for the carrier under consideration. If a response is received then the process proceeds to condition step 450. If, however, a response is not received for that carrier then the process proceeds at step 480. At step 480, the carrier is maintained as being potentially associated with that formatted requested address. Note that the association of a potential carrier with a formatted requested address can be maintained in a database for example stored on storage device 170. FIG. 3 illustrates an example of such a database.

At conditional step 450, a determination is made as to whether the query response is positive or not. If the received query response is not positive then the process proceeds to step 460. At step 460, the carrier correlated with that formatted requested address is invalid and a value of its associated validity indicator 370 is updated as invalid. If, however, the received query response is positive then the process proceeds to step 470. At step 470, the carrier correlated with that formatted requested address is valid and a value of its associated validity indicator 370 is updated as valid.

Figure 2D:
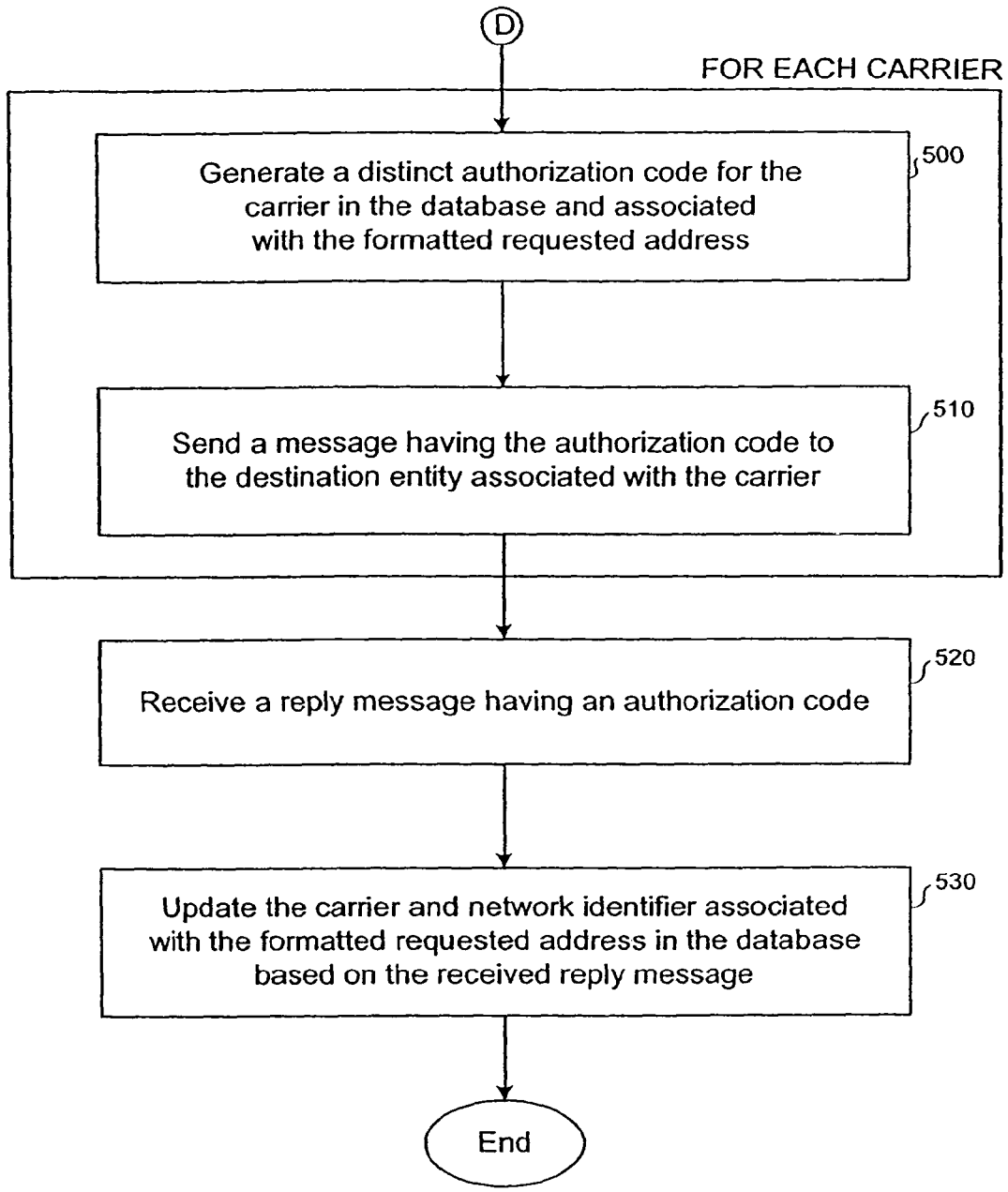

At conditional step 490, a determination is made as to whether the received message is an authorization message. If the received message is an authorization message then the process proceeds to step 500 as shown in FIG. 2D. If, however, the received message is not an authorization message then the process proceeds to step 495.

If a specific carrier has not been uniquely identified with the formatted requested address (or all but one carrier has been eliminated as being invalid) then at this point in the process multiple carriers still could potentially be correctly associated with the formatted requested address. Consequently the received message needs to be multicasted to each of the potentially correct carriers as described in conjunction with step 495.

For each remaining carrier having either a valid validity indicator 370 or a undetermined validity also as indicated by validity indicator 370 steps 500 and 510 are performed. Generally speaking, steps 500 through 530 describe the self-authorization process typically performed when the received message is an authorization message.

At step 500, a distinct authorization code for a given carrier and associated with the formatted requested address is generated. At step 510, a message having the authorization code is sent to the potential destination entity associated with that carrier. The authorization code can be, for example, a randomly generated alphanumeric code uniquely assigned to a given carrier and indicative of the time at which the code was generated. Thus, receiving a reply message including the authorization code will indicate the correct carrier and generation of the authorization code. Steps 500 and 510 are repeated for each carrier associated with a formatted requested address that is known not to be invalid (i.e., valid or having an unknown validity). Steps 500 and 510 can be performed in the case where self authentication is being performed for a single carrier (i.e., where there is only one potentially valid carrier associated with the formatted requested address). Alternatively, steps 500 and 510 can be performed multiple times, once for each carrier in the case where multiple carriers could be potentially valid for a given associated formatted requested address.

At step 520, a reply message is received from the destination party. The reply message can include the authorization code. For example, in one embodiment, the message sent in step 510 can include an explicit identification of the authorization code and can request that the destination party respond with a reply including this authorization code. In such a case, the reply message will explicitly have the authorization code included in the message. Note that in the case where multiple messages were sent out in step 510 (each message being associated with a potentially correct carrier), typically only a single reply message will be received. This is because, generally speaking, of the multiple potential carriers correlated with a formatted requested address, only one will be correctly associated with a destination entity of the destination party. The remaining carriers are not correctly associated with the destination party and, as such, typically would not generate a reply to the messages sent out in steps 510.

At step 530, the validity indicators 370 associated with the formatted requested address are updated based on the received reply message. Thus, validity indicators 370 associated with the various carrier identifiers 320, network identifiers 330 and gateway identifiers 340 are marked as either valid or invalid. For example, for the formatted requested address of 401-555-1212, the first address in database record 301, the first two carrier identifier/network identifier/gateway identifier combinations are initially recorded as having an unknown validity indicator 370. Depending upon the reply message received in step 520, presumably one of these carrier identifier/network identifier/gateway identifier combinations can be validated and its associated validity indicator 370 value changed from unknown to valid.

Figure 2E:
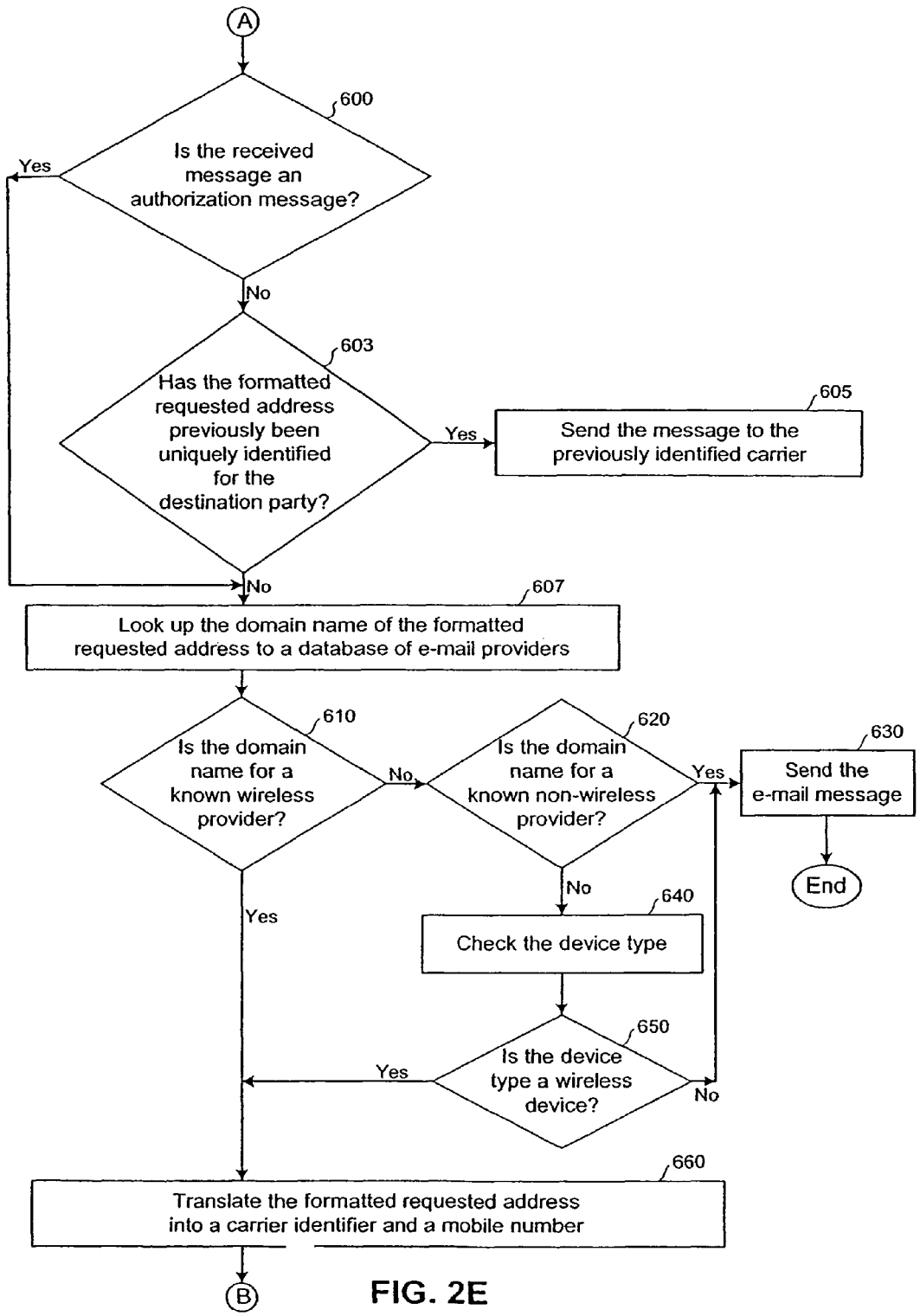

FIG. 2E illustrates a portion of the process relating to non-number-based destination addresses. At conditional 600, a determination is made as to whether the received message is an authorization message. As described above, an authorization message is a message sent from a service platform (e.g., service platform 160) to a destination party inviting the destination part to reply to the message, thereby self authenticating the appropriate routing information needed for future routing to that particular destination party. If the received message is an authorization message then the process proceeds to step 607. If the received message is not an authorization message then the process proceeds to conditional step 603.

At conditional step 603, a determination is made as to whether the formatted requested address previously has been uniquely identified for the destination party. If the formatted requested address has been previously identified for the destination party then the process proceeds to step 605. At step 605, the message is sent to the previously identified destination address. If the destination address, however, has not been previously and uniquely identified for the destination party then the process proceeds to step 607.

At step 607, the domain name of the formatted requested address is looked up in a database (not shown) of e-mail providers. At conditional step 610, a determination is made as to whether the domain name is associated with a known wireless provider. If the domain name is associated with a known wireless provider then the process proceeds to step 660. If the domain name, however, is not associated with a known wireless provider then the process proceeds to conditional step 620.

At conditional step 620, a determination is made as to whether the domain name is associated with a known non-wireless provider. If the domain name is associated with a known non-wireless provider then the process proceeds to step 630. At step 630, the received e-mail message is sent to the destination entity associated with that domain name. If the domain name is not associated with a known wireless provider then the process proceeds to step 640. At step 640, the device type is determined.

At conditional step 650, a determination is made as to whether the destination entity is a wireless device based upon the device type determined in step 640. If the device type is not a wireless device then the process proceeds to step 630. If the device type is a wireless device then the process proceeds to step 660.

At step 660, the formatted requested address is translated to a carrier identifier and a mobile telephone number (not shown in database record 301 of FIG. 3). The process then proceeds to conditional step 300 shown in FIG. 2B.

Figure 5:
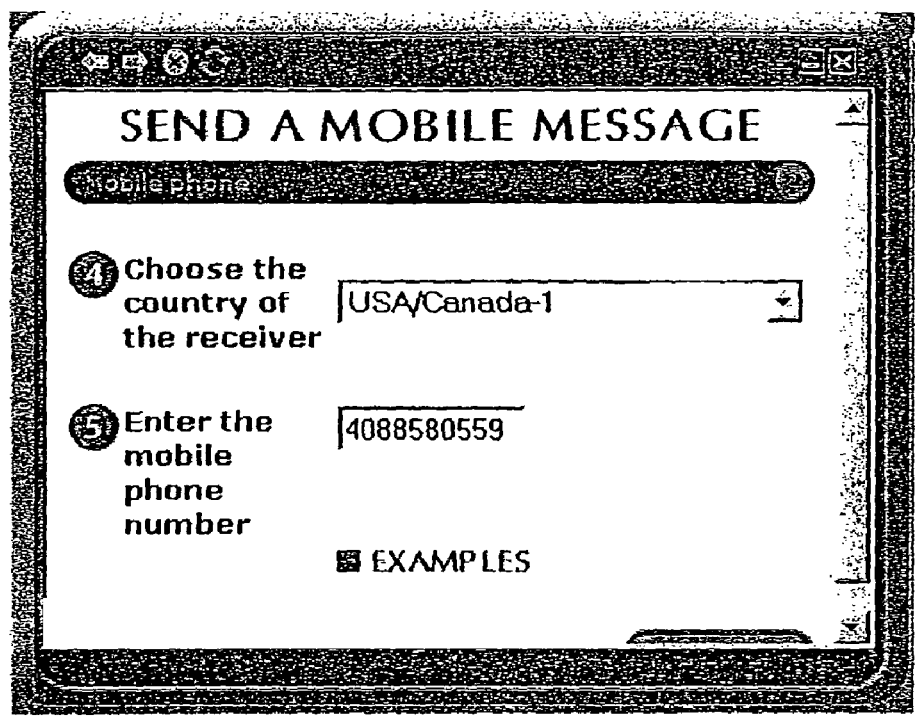
FIGS. 5 and 6 illustrate an example of portions of a graphical user interface for performing universal address recognition for text-capable communication devices, according to an embodiment of the present invention.
Figure 6:

FIGS. 5 and 6 illustrate an example of portions of a graphical user interface for performing universal address recognition for text-capable communication devices, according to an embodiment of the present invention. As the example of the GUI portion shown in FIG. 5 illustrates, a source party can select a destination country and a destination mobile phone number of a desired destination party. Upon entering this information, the recognition of the appropriate destination address can be performed by a process, for example, similar to that discussed above in reference to FIGS. 2A through 2E. As the example of GUI portion shown in FIG. 6 illustrates, the source party can be notified of the successful address recognition (e.g., mobile phone number 408-858-0559 corresponds to Cellular One SF). Although not shown to the source party through the GUI, the network/carrier/gateway identifiers can be determined based on the formatted requested address (in this case, the mobile phone number input through the GUI). In other words, the implementation and the results of the recognition process can be transparent to the source party.

At this point the example of FIGS. 5 and 6, the source party can then make a "compose" selection to view another GUI portion where the source party can provide the text portion of the text message. Once the text portion of the text message is completed, the text message can be routed to the proper destination entity associated with the destination party.

Figure 4:
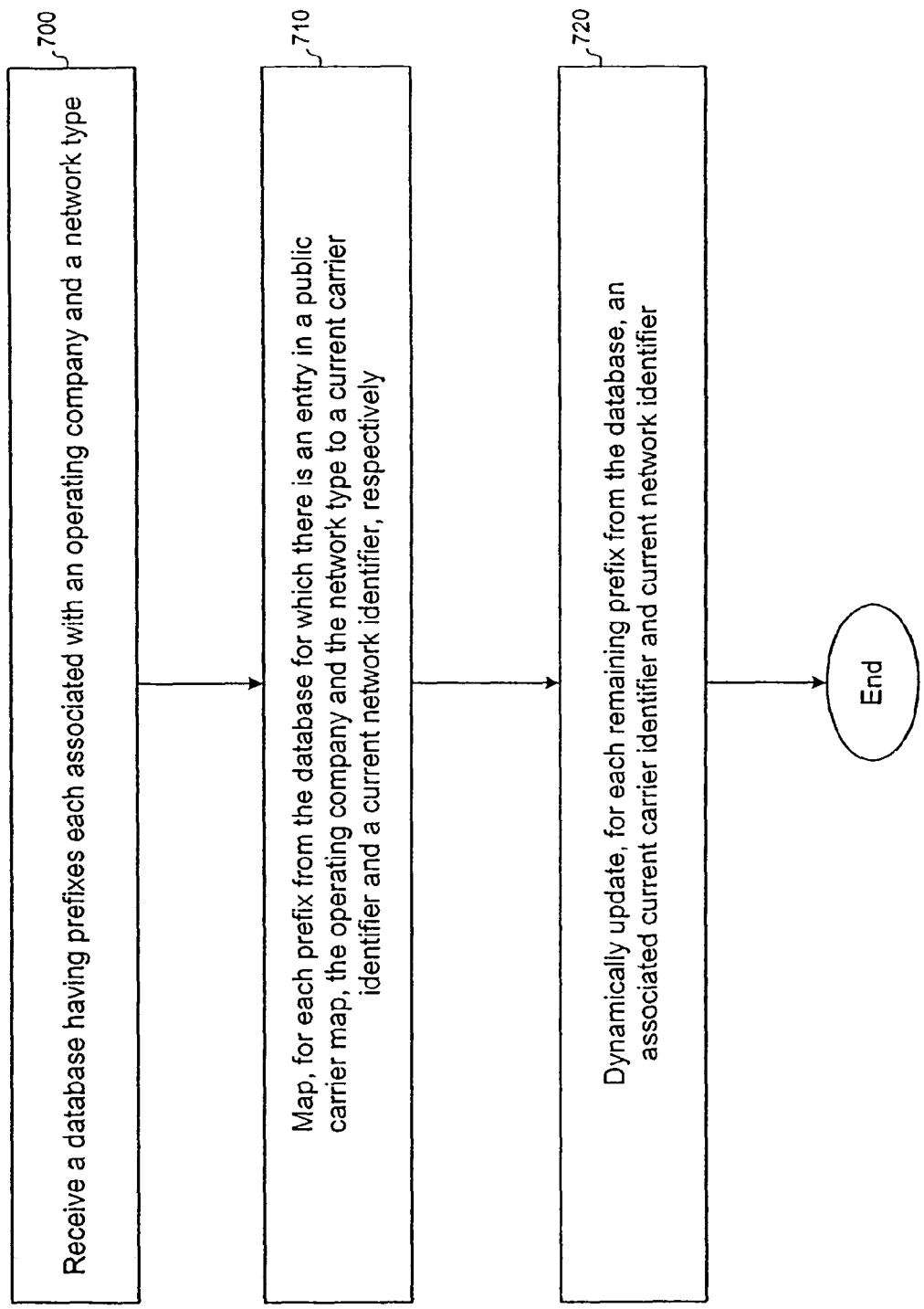
FIG. 4 illustrates a process to populate a database correlating destination addresses with validity indicators, according to an embodiment of the present invention.

FIG. 4 illustrates a process to populate a database correlating destination addresses with validity indicators, according to an embodiment of the present invention. At step 700, records having prefixes each associated with an operating company and a network type are received. The records of the operating company and network type can be obtained, for example, from public records relating to the initial sale of the electromagnetic spectrum relating to these networks. In such a case, the operating companies that initially purchased the associated spectrum license may be merely holding or investment companies that subsequently transferred the licenses to telephone companies. This case will be addressed below. Note these records potentially contain a very large collection of information because a substantial number of networks and carriers exist. For example, worldwide there are over 370 wireless carriers most of which operate multiple networks.

At step 710, a public carrier map is used to map (or translate) the operating company and the network type to the current carrier identifier and the current network identifier, respectively, for each prefix within the database. Such a public carrier map can implicitly indicate the transfer of ownership from the initial purchasing operating company to the current company operating the network. This step can successfully update approximately 60% of the prefixes within the database for which sufficient information exists within public carrier maps. Such public carrier maps are available, for example, through the appropriate government entities that maintain these types of records.

These records can be used, for example, to build a database having records like the example shown in FIG. 3. The originally assigned operating company and network type can be populated into the carrier identifier and the network identifier, respectively, for the various prefixes associated with the communication networks of interest.

At step 720, each prefix in the database for which an entry did not exist within the public carrier map has its associated current carrier identifier and current network identifier dynamically updated as specific requested addresses are updated according to the process described above in reference to FIGS. 2A through 2E and 3. Thus, as an increasing number of requested addresses are processed according to the process described above, the database can be updated increasingly to reflect an increasing number of valid carriers (i.e., and its associated routing information).

Although the present invention has been described in reference to certain embodiments and processes, other embodiments and processes are possible. For example, although an embodiment of the present invention have been described in reference to a client-server configuration where a service platform provides the universal address recognition features from a centralized location within a communication network, embodiments of the present invention can allow for the functionality of the service platform to reside at the client side. In such a configuration, a communication device (e.g., communication device 130) or a service entity (e.g., service entities 110 or 120) from which a message is to be sent can include the functionality locally so that a universal address can be recognized before the message is sent. Such a configuration can be characterized, for example, as a client-client configuration.

While the process of universal address recognition has been described in reference to particular steps, alternative embodiments of the process can perform similar functionality in different order or even partially (e.g., without performing the self-authorization process).

What is claimed is:

1. A method for obtaining an international destination address for a text message, comprising:
    determining, via one or more processors, a carrier type for a text message identifying a valid requested address, wherein (1) the valid requested address is associated with a destination party and (2) the valid requested address comprises at least a portion of an international telephone number;
    in response to the determined carrier type comprising a single-match carrier type, determining a proper destination address based on the valid requested address, wherein (a) the single-match carrier type is identified only when a portion of the requested address is unique to a single carrier and (b) the proper destination address comprises the valid requested address; and
    in response to the determined carrier type comprising a multiple-match carrier type, validating each of a plurality of candidate destination addresses associated with the destination party to determine which one of the plurality of candidate destination addresses is the proper destination address by sending an availability request to each candidate destination address.

2. The method of claim 1, further comprising determining a destination country associated with the valid requested address.

3. The method of claim 1, wherein the multiple-match carrier type comprises at least one from a group of an embedded-carrier-information destination address and portable destination address.

4. The method of claim 1, wherein validating further comprises:
    receiving at least one response to the sent availability requests, each received response being uniquely associated with one of the plurality of candidate destination addresses and indicating at least one from a group of a valid destination address and an invalid destination address; and
    recording, for each received response, a value associated with the candidate destination address associated with the received response, the value indicating at least one from the group of a valid destination address and an invalid destination address based on the received response associated with the candidate destination address.

5. The method of claim 4, further comprising sending a text message to each candidate destination address from the plurality of candidate destination addresses for which no response was received to the sent availability requests.

6. The method of claim 4, wherein a text message is sent to each one of the plurality of candidate destination addresses that has an associated value indicating a valid destination address.

7. The method of claim 1, wherein each candidate destination address from the plurality of candidate destination addresses comprises at least a carrier identifier, a network identifier, a device identifier and a gateway identifier.

8. The method of claim 1, wherein validating further comprises:
    generating a plurality of codes, each code being uniquely associated with one of the plurality of candidate destination addresses;
    sending a message to each candidate destination address from the plurality of candidate destination addresses, each message being uniquely associated with a candidate destination address from the plurality of candidate destination addresses and comprising a code from the plurality of codes associated with the candidate destination address;
    receiving a self-authentication message from a candidate destination address from the plurality of candidate destination addresses, the self-authentication message comprising a code value; and
    validating the candidate destination address based on the code value of the self-authentication message corresponding to a code from the plurality of codes.

9. A non-transitory computer-readable medium having instructions stored thereon, the instructions when executed by a computer cause the computer to:
    determine a carrier type for a text message identifying a valid requested address, wherein (1) the valid requested address is associated with a destination party and (2) the valid requested address comprises at least a portion of an international telephone number;
    in response to the determined carrier type comprising a single-match carrier type, determine a proper destination address based on the valid requested address, wherein (a) the single-match carrier type is identified only when a portion of the requested address is unique to a single carrier and (b) the proper destination address comprises the valid requested address; and in response to the determined carrier type comprising a multiple-match carrier type, validate each of a plurality of candidate destination addresses associated with the destination party to determine which one of the candidate destination addresses is the proper destination address by sending an availability request to each candidate destination address of the plurality of candidate destination addresses.

10. The computer-readable medium of claim 9, wherein the multiple-match carrier type comprises at least one from a group of an embedded-carrier-information destination address and portable destination address.

* * * * *